T. J. BARBRE & J. G. TREFZ.
ROCK DRILL.
APPLICATION FILED MAY 15, 1911.
1,044,337.
Patented Nov. 12, 1912.
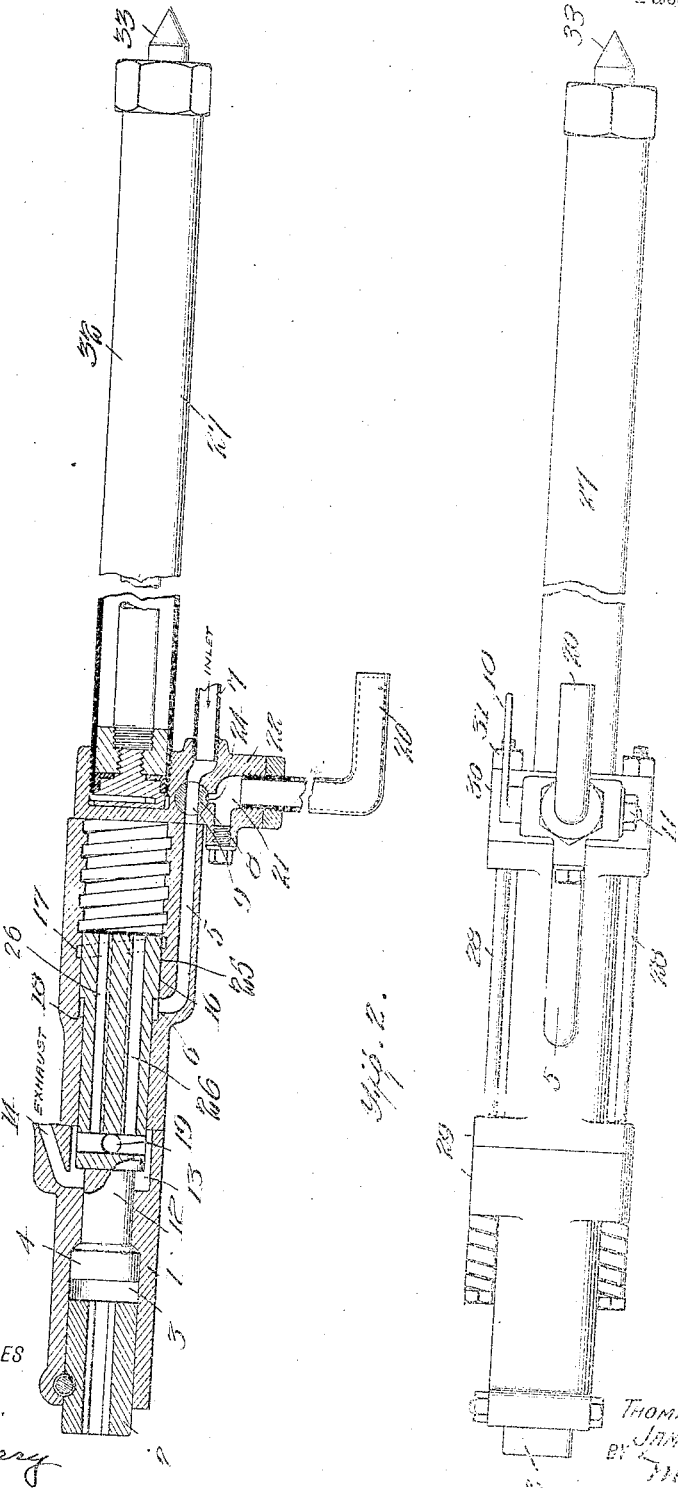
WITNESSES
INVENTORS
Thomas J. Barbre
James G. Trefz
BY
ATTORNEYS

UNITED STATES PATENT OFFICE.

THOMAS J. BARBRE AND JAMES G. TREFZ, OF DENVER, COLORADO, ASSIGNORS TO WESTERN MACHINERY & MANUFACTURING COMPANY, A CORPORATION OF COLORADO.

ROCK-DRILL.

1,044,337.  Specification of Letters Patent.  Patented Nov. 12, 1912.

Application filed May 15, 1911. Serial No. 627,145.

*To all whom it may concern:*

Be it known that we, THOMAS J. BARBRE and JAMES G. TREFZ, citizens of the United States, and residents of Denver, county of Denver, and State of Colorado, have invented certain new and useful Improvements in Rock-Drills, of which the following is a specification.

Our invention is an improvement in rock drills, of the valveless piston hammer type, actuated by fluid under pressure, and has for its object a simplification of construction and an increase of efficiency.

In the drawings, Figure 1 is a longitudinal section of the improvement, Fig. 2 is a view at right angles to Fig. 1.

In the present embodiment of the invention, a casing 1 is provided, having at one end a chuck 2 for holding the tool, and having a chamber 3 adjacent to the inner end of the chuck, in which moves the hammer 4. Near its opposite end, the casing is provided with a passage 5, in its wall, communicating at one end with a chamber 6 in the casing, and at its opposite end with the inlet pipe 7, for the fluid under pressure. A valve 8 is rotatable in a valve casing 22, in a recess arranged transversely of the passage, and controls the said passage. The valve has a transverse opening 9, which, when the valve is in the position of Fig. 1, admits the fluid to the chamber 6. The casing 22 is arranged transversely of the rear end of the casing.

The valve is operated by a handle 10 at one side of the casing, and is held in place by a nut 11 at the opposite side. The plunger, of which the hammer 4 is a part, is reduced behind the hammer as indicated at 12, and the bore or chamber of the casing is reduced to fit the plunger. At the inner end of the reduced portion, the chamber or bore is enlarged, as indicated at 13, and the casing is provided with an exhaust opening 14, leading outwardly and rearwardly from the chamber. In rear of the reduced portion 12, the plunger is of normal cross section for some distance as indicated at 15, and is then enlarged as indicated at 16, to fit the chamber 6 of the casing. The casing near this point is also provided with an internal spiral passage 17, and a shoulder 18 is formed in the casing at the junction of the chamber 5 of the casing with the main portion. The main portion 15 of the plunger is also provided with a transverse opening 19, near the reduced portion 12, and with longitudinal passages 26, leading from the opening 19 to the rear end of the plunger.

A handle 20 is provided for handling the drill, and an oil reservoir 21 is provided in the valve casing 22 to which the handle 20 is also connected. A plug 23 is threaded into a filling opening of the valve casing for closing the same, and it will be noticed that the valve 8 extends into the oil reservoir at one side, and is provided with a groove or recess 24, for taking up a portion of the oil, when the valve is turned. It will be evident, that when the valve is turned, the oil taken up by the groove will be distributed on the wall of the recess in which the valve is held, and will retain the valve perfectly lubricated. A feed tube 27 is threaded at its inner end into the valve casing 22, in alinement with the casing 1, and the casing 1, valve casing 22 and feed tube 27 are held together by bolts 28, which extend through lateral ears 29 and 30 on the casing 1, valve casing 22, respectively, and are engaged by nuts 31 to hold the bolts in place. A spring 28ª is arranged on each bolt, between the head thereof, and the adjacent lug 29 on the casing. A feed piston 32 is arranged in the tube, and is extended out of the tube at its rear end, and pointed at 33 to engage a support. The piston feeds the drill in the usual manner.

In operation, when the plunger or piston is in forward position, the fluid being admitted through the valve 8 to the passage 5, enters the chamber 6 and acts upon the shoulder 25 of the plunger, which is formed between the portions 15 and 16 of the plunger, to force the said plunger rearwardly. As soon as the passage or opening 19 is moved out of the chamber 6, the said passage is closed by the casing walls, but until this occurs, the space in the casing at the rear of the plunger is in communication with the exhaust through the passages 26 of the plunger. When the shoulder 25 uncovers the forward end of the commencement of the spiral passage 17, the motive fluid is admitted to the said passage, and travels along the same to the rear of the piston, and reaches the said rear end at the same time that the piston is fully retracted. The fluid thus acts immediately on the rear end of the piston, and forces the same forwardly or outwardly, driving it against the inner end of the tool held in the chuck 2. When the portion 16 of the piston, in its outward movement cuts the communication between the chamber 6 and the passage 17, the motive fluid is cut off from the space in rear of the piston, and at the same time the passage 19 enters the chamber 13, and places the said space in communication with the exhaust.

We claim:—

1. A device of the character specified, comprising a casing, a piston slidable therein, and having an enlarged inner end to form a shoulder between the said enlarged end and the main portion, said piston having a longitudinal passage leading from its inner end toward the outer end and opening laterally adjacent to the said outer end, the casing having a chamber near the forward end of the plunger, and an exhaust opening leading from the chamber and having an inlet passage for the motive fluid and a chamber into which the passage opens, said chamber being at a point adjacent to the shoulder of the piston when the said piston is in its outermost position, the said casing having an internal spiral groove forming a passage for the motive fluid and leading from the inner end thereof toward the front and stopping short of the chamber into which the inlet passage opens.

2. In a device of the character specified, a casing, a piston slidable therein and having a hammer at its outer end and an annular shoulder near the inner end, the casing having an inlet chamber between the shoulder and the hammer, and an exhaust chamber near the hammer, said piston having a longitudinal passage leading from the end adjacent to the shoulder and having a lateral outlet opening into the exhaust chamber when the piston is at the end of its outward stroke, said casing having an internal spiral passage leading from the inner end to a point near the inlet chamber and communicating therewith when the shoulder has uncovered the said passage.

3. A device of the character specified, comprising a casing, a piston movable therein, the inner end of the piston being enlarged to form an annular shoulder between the enlarged portion and the main portion, said casing having a chamber in which the said enlarged end moves, and having an inlet passage at the end of the chamber adjacent to the shoulder for admitting the motive fluid to act upon the shoulder, said casing having an internal spiral groove forming a passage for conducting the motive fluid from the inlet passage to the opposite end of the chamber, said passage being spaced apart from the inlet passage and adapted to be placed in communication therewith when the shoulder uncovers the end of the passage, said casing having an exhaust chamber adjacent to the outer end thereof, the piston having a longitudinal passage leading from the enlarged end and opening into the exhaust chamber when the piston is at the limit of its outward stroke.

4. In a device of the character specified, the combination with the cylinder or casing, of a piston movable therein, the inner end of the casing being enlarged annularly, and the piston having an annular rib fitting the enlarged portion, said casing having an inlet opening at the outer end of the enlarged portion and a spiral passage leading from a point adjacent to the inlet opening to the inner end of the casing, said piston having an exhaust opening extending substantially longitudinal thereof, and the casing having an outlet communicating therewith when the piston is at the end of the outward stroke.

5. In a device of the character specified, a casing having one end open and having its inner end enlarged annularly, said casing having an inlet opening near the outer end of the enlarged portion, and an internal spiral passage leading from a point adjacent to the said opening to the inner end of the casing, and a piston having an annular rib near its inner end fitting the enlarged portion, said casing having an exhaust passage uncovered by the piston at the end of its outward stroke.

6. A device of the character specified, comprising a casing having one end open and having the other end closed and enlarged annularly, the casing having an inlet opening for the motive fluid near the outer end of the enlarged portion, and an internal spiral groove leading from a point adjacent to the said opening to the inner end of the casing, a piston having an annular rib at its inner end fitting the enlarged portion for closing the communication between the inlet and the adjacent end of the passage when the piston is near the end of its outward stroke, and for placing the inlet in communication with the adjacent end of the groove when the piston is near the end of its inward stroke, the casing having an exhaust passage uncovered by the piston at the end of its outward stroke.

THOMAS J. BARBRE.
JAMES G. TREFZ.

Witnesses:
 OTTO KOCH,
 EUGENE ELDER.